United States Patent
Schorb et al.

(10) Patent No.: US 10,107,695 B2
(45) Date of Patent: Oct. 23, 2018

(54) FIBER-OPTIC SENSOR WITH A PROTECTIVE TUBE AND METHOD FOR INSTALLING A FIBER-OPTIC SENSOR IN THE PROTECTIVE TUBE

(71) Applicant: Siemens Aktiengesellschaft, Munich (DE)

(72) Inventors: Herbert Schorb, Karlsruhe (DE); Stefan Von Dosky, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 342 days.

(21) Appl. No.: 14/944,365

(22) Filed: Nov. 18, 2015

(65) Prior Publication Data

US 2016/0161346 A1    Jun. 9, 2016

(30) Foreign Application Priority Data

Nov. 19, 2014   (DE) .................. 10 2014 223 639

(51) Int. Cl.
  *G01K 11/32*   (2006.01)
  *G01K 1/14*    (2006.01)
  *G02B 6/44*    (2006.01)

(52) U.S. Cl.
  CPC .............. *G01K 11/32* (2013.01); *G01K 1/14* (2013.01); *G01K 11/3206* (2013.01); *G02B 6/4486* (2013.01)

(58) Field of Classification Search
  CPC ...... G01K 11/32; G01K 1/14; G01K 11/3206; G02B 6/4486
  See application file for complete search history.

(56) References Cited

U.S. PATENT DOCUMENTS

| | | | | |
|---|---|---|---|---|
| 3,751,305 A | * | 8/1973 | Huebscher | G01K 1/14 136/221 |
| 4,628,141 A | * | 12/1986 | Wieszeck | G01K 1/14 136/221 |
| 4,775,213 A | * | 10/1988 | Kitayama | G02B 6/4407 385/101 |
| 8,098,967 B1 | * | 1/2012 | Bazzone | G01J 1/0492 250/227.11 |

(Continued)

FOREIGN PATENT DOCUMENTS

| | | |
|---|---|---|
| DE | 198 44 753 | 2/2000 |
| DE | 10 2004 031 324 | 1/2006 |

(Continued)

*Primary Examiner* — Lisa Caputo
*Assistant Examiner* — Philip Cotey
(74) *Attorney, Agent, or Firm* — Cozen O'Connor

(57) ABSTRACT

A method for installing a fiber-optic sensor in a protective tube, wherein a reshapable filler element which is preferably a wire made of spring steel is used as the filler element that, when twisted assumes an essentially helical shape, is introduced into the protective tube essentially in parallel to the axis of the fiber-optic sensor, where by changing the shape of the filler element, the free internal cross-section of the protective tube remaining for supporting the fiber-optic sensor is reduced such that the sensor is pressed against the wall of the protective tube whereby the thermal interface between the protective tube and sensor is improved and the reaction time during temperature measurements is reduced.

7 Claims, 3 Drawing Sheets

(56) References Cited

U.S. PATENT DOCUMENTS

| | | | | |
|---|---|---|---|---|
| 8,103,135 B2 * | 1/2012 | Head | ............... | E21B 17/023 385/12 |
| 2003/0127587 A1 * | 7/2003 | Udd | ............... | G01D 5/35383 250/227.14 |
| 2006/0233484 A1 * | 10/2006 | Van Neste | ............... | G01J 3/1895 385/12 |
| 2007/0223000 A1 * | 9/2007 | Gahan | ............... | G01D 5/266 356/454 |
| 2009/0043288 A1 * | 2/2009 | Petrakis | ............... | A61M 31/002 604/890.1 |
| 2010/0178020 A1 | 7/2010 | Griffioen et al. | | |
| 2012/0026482 A1 * | 2/2012 | Dailey | ............... | G01D 5/35303 356/43 |
| 2012/0308174 A1 * | 12/2012 | Head | ............... | E21B 17/023 385/13 |
| 2013/0028555 A1 * | 1/2013 | Dailey | ............... | B32B 7/02 385/12 |
| 2013/0209949 A1 * | 8/2013 | Saito | ............... | G01K 1/14 432/36 |
| 2013/0323023 A1 * | 12/2013 | McCarthy | ............... | G01K 1/14 415/118 |
| 2014/0177675 A1 * | 6/2014 | Rennie | ............... | H01H 61/0107 374/188 |

FOREIGN PATENT DOCUMENTS

| | | |
|---|---|---|
| EP | 2 202 552 | 6/2010 |
| JP | 61-66133 | 4/1986 |
| JP | 03-158728 | 7/1991 |
| JP | 2003-083816 | 3/2003 |

* cited by examiner

FIBER-OPTIC SENSOR WITH A PROTECTIVE TUBE AND METHOD FOR INSTALLING A FIBER-OPTIC SENSOR IN THE PROTECTIVE TUBE

BACKGROUND OF THE INVENTION

1. Field of the Invention

The present invention relates to a fiber-optic sensor with a protective tube and method for installing a fiber-optic sensor in the protective tube, where the fiber-optic sensor is pushed into the protective tube through an end of the protective tube open during installation.

2. Description of the Related Art

For applications in process measurement technology and process engineering, multi-point thermometers, in which a number of temperature measuring points are disposed along the same fiber of a fiber-optic sensor and which make it possible to simultaneously measure a number of temperatures, are frequently of interest. Here, only one fiber-optic sensor is needed for almost any given number of measuring points, with a connector, to which a transmitter is connected, which is used to determine the individual measured temperature values through optoelectronic signal processing. For example, within a process engineering system, measured temperature values established in this way can be forwarded with the aid of the transmitter to a superordinate control or a superordinate command and control system, and can be used for closed-loop control of a process running on the system. Temperature measurements of this type are not only needed, for example, at reactors, pipes, vessels, tanks but also in drilled holes, tunnels or culverts. DE 10 2004 031 324 A1, discloses a conventional fiber-optic sensor that is suitable for measuring the temperature in a process engineering system.

In fiber-optic sensors with what are known as "Bragg gratings" for detecting the temperatures at different points of the fiber, the Bragg grating is effectively "burnt-in" by optical illumination at the different measuring points. Each sensor element then measures "its own" local temperature, in that each sensor reflects, as a function of the temperature, a wavelength of the light radiated in through the fiber from the transmitter. In the transmitter, the wavelength of the reflected light is determined precisely and is computed back to the associated temperature values via a calibration equation. The fact that each sensor element is burnt in for a different wavelength means that, in principle, the transmitter can read out any given number of sensor elements. The number of sensor elements on a fiber-optic sensor frequently lies between 5 and 30.

To protect against mechanical stress, the actual measuring fiber is usually enclosed in a stainless steel hollow tube, the internal diameter of which amounts to, e.g., 0.7 mm, and the external diameter of which amounts to, e.g., 1.2 mm. In order to damp out any vibrations that might occur at the installation site, a woven protective sleeve can be pulled over the stainless steel tube. In order to simplify matters here, a measuring fiber with a stainless steel hollow tube and also a measuring fiber with a stainless steel hollow tube and protective sleeve are uniformly referred to as a fiber-optic sensor.

At the respective installation site, fiber-optic sensors are usually mounted in a permanently-installed protective tube, which is located, for example, on or in a chemical reactor. The fiber-optic sensor thus must be installed in the protective tube on site. EP 2 202 552 A1 discloses a suitable method for installing a fiber-optic sensor in a protective tube. Here, in order to install it, the fiber-optic sensor is pushed through an open end of the protective tube into the tube and brought into its axial target position, so that the individual sensor elements can detect temperatures at the desired points along the axis of the protective tube.

A protective tube, which is required for the mechanical protection of a fiber-optic sensor, can be problematic during the measurement of variable temperatures, however, because the different layers that are disposed around the actual measurement fiber make it more difficult to rapidly detect temperature changes in the process. The flow of heat from the process medium to the measurement fiber is especially slowed down by the air space, which may be present within the protective tube, which exists between the fiber-optic sensor and the inner wall of the protective tube if the sensor is not resting against the inner wall. An advantage of fiber-optic sensors for temperature measurements, i.e., their potentially fast reaction time because of the low thermal capacity of the sensor, can therefore disadvantageously be lost as a result of installing the sensor in a protective tube. It is known that the reaction time of a fiber-optic sensor, which amounts to 3 seconds without a protective tube, for example, can increase by a factor of 20 when the same sensor is installed in a protective tube with a diameter of 12 mm. This represents a significant disadvantage with respect to measurement accuracy and dynamics.

SUMMARY OF THE INVENTION

It is therefore an object of the invention to provide a method for installing a fiber-optic sensor in a protective tube, with which a sensor arrangement is reliably obtained, wherein short reaction times during temperature measurements performed via the fiber-optic sensor located in the protective tube are achieved. A further object is to provide a fiber-optic sensor with a protective tube having improved measurement characteristics and which is suitable for implementing the method in accordance with the invention.

These and other objects and advantages and achieved in accordance with the invention by a method and fiber-optic sensor with a protective tube, where in an axial area of the protective tube in which sensor elements for temperature detection are located when the fiber-optic sensor is inserted in the tube, a reshapable filler element is introduced into the protective tube. Reshapable in this context means that, by changing the shape of the filler element, the size of the free internal cross-section remaining free for supporting the fiber-optic sensor in the protective tube can be varied. With a large free internal cross-section, the fiber-optic sensor can be moved within the protective tube without any greater friction or any danger of the sensor sticking. Thus, in this state of the shaping element, the fiber-optic sensor is insertable into the protective tube, or is readily removable from the protective tube for replacement or for maintenance work. In this way, an insertion or removal of the fiber-optic sensor for a later replacement or exchange during maintenance work is fascilitaed. By contrast, during operation of a process engineering system, in which temperature measurements are performed via the fiber-optic sensor, through the changed shape of the filler element, the free internal cross-section of the protective tube remaining to support the fiber-optic sensor is reduced such that the fiber-optic sensor is pressed, for an enhanced thermal contact, against the internal wall of the protective tube. Since the remaining free cross-section of the measuring tube is able to be varied by the shaping filler element, where the filler element can already be present in the protective tube when the fiber-optic sensor is being installed, it can be inserted into the protective tube together with the fiber-optic sensor or it can be added into the protective tube only after the fiber-optic sensor has been brought into its axial target position within the protective tube.

One possibility of realizing a reshapable filler element can be seen in an inflatable sleeve similar to a balloon catheter, as is used in surgery for expanding coronary vessels. The filler element is then a thin plastic hose with one or more inflatable balloons, which are preferably located, with the sensor introduced into the protective tube, at the positions of the sensor elements of the fiber-optic sensor. So that, if the balloon collapses because of loss of pressure during extended operation, the free internal cross-section in the protective tube does not become larger again. In addition, a tubular metal mesh like a type of stent can be introduced into the protective tube folded together with the balloon. By inflating the balloon, the metal mesh is pressed against the inner wall of the tube to reduce the free cross-section and to push the fiber-optic sensor against the inner wall. In order to remove the fiber-optic sensor for replacement or maintenance purposes, the thin plastic hose and/or the metal mesh can be pulled out of the protective tube in a simple manner via a guide wire.

The manufacturing outlay and also the outlay associated with the installation of the filler element in the protective tube are especially low when the filler element is formed as a wire. In order to reduce the remaining free internal cross-section of the protective tube, after the insertion of the fiber-optic sensor, the wire is twisted around its longitudinal axis such that, as a result of the torsional stress arising in the wire during this process, the wire assumes a helical shape. Here, the mechanical property of long wire is used that, when two axially spaced points of the wire are twisted against one another and during this process a shortening of the distance between the two points is allowed, the wire, by assuming a helical shape, attempts to avoid an increase in the torsional stress in the wire. If the fiber-optic sensor is to be removed from the protective tube for replacement or repair purposes, only the twisting of the wire has to be relieved again, so that the sensor is no longer pushed by the wire against the inner wall of the protective tube and is thus easily moveable in the protective tube. The wire then re-adopts its original shape and lies essentially parallel to the fiber-optic sensor again.

In an especially advantageous exemplary embodiment, the wire used to realize the filler element is manufactured from spring steel. This is characterized by its high long-term stability and thus, because of its spring force, guarantees that the fiber-optic sensor is pushed against the internal wall of the protective tube over the long term. In such cases, depending on the respective application, a spring steel with high heat tolerance can be selected, such as Inconel X750. This insures that the pressing of the fiber-optic sensor against the protective tube does not diminish over the lifetime of the sensor arrangement.

When the fiber-optic sensor is designed as a measuring fiber with this surrounding steel hollow tube, in particular the outlay involved in the installation of the sensor in the protective tube can be greatly reduced by the wire with which the filler element is realized possessing a smaller torsional stiffness than the steel hollow tube and by being connected to the steel hollow tube at a point ahead of the sensor elements during insertion. In this way, the fiber-optic sensor and filler element can be prepared outside the protective tube and pushed into the protective tube together.

The connection point of the wire and steel hollow tube can advantageously be realized with the aid of a slider element, to which both the wire and also the steel hollow tube are soldered or welded at their respective ends. As a result, a trouble-free insertion without too great a friction or danger of sticking is achieved.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and also its embodiments and advantages, are explained in greater detail below with reference to the drawings, in which an exemplary embodiment of the invention is shown, in which.

DETAILED DESCRIPTION OF THE EXEMPLARY EMBODIMENTS

The figures are not true-to-scale and are merely intended as an illustration of the invention and to make it easier to understand.

Figure 1:
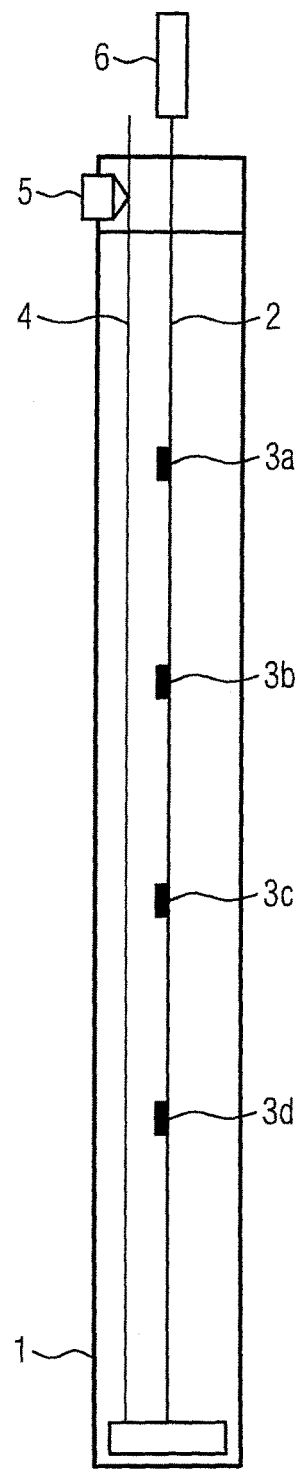
FIG. 1 shows a sectional diagram of a protective tube with inserted fiber-optic sensor in accordance with the invention.
Figure 2:
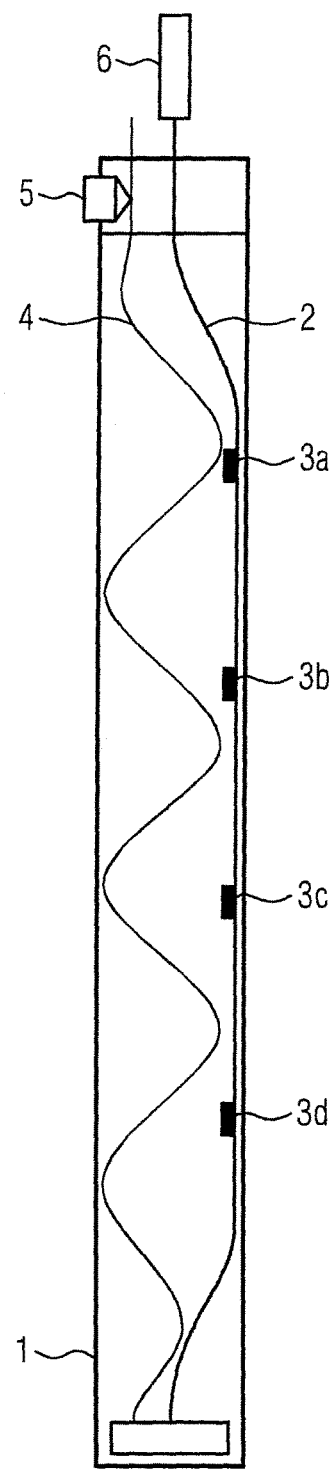
FIG. 2 shows a sectional diagram of a protective tube with a twisted steel wire as a reshapable filler element.

FIGS. 1 and 2 show the principle structure of a fiber-optic measuring arrangement for measuring temperatures at different points in a process technology system, for example, at different points within a chemical reactor, in which a protective tube 1 has already been installed by a user. The same parts are provided with the same reference characters. The protective tube 1 has an internal diameter of 12 mm, for example. A fiber-optic sensor 2, usually obtained by the user from a manufacturer of measuring devices is inserted into the protective tube 1. The fiber-optic sensor 2 has Bragg gratings as sensor elements 3a, 3b, 3c and 3d for measuring temperatures at the respective points at which the temperature of a process medium located in the reactor is to be measured. A steel wire 4, which is shown in FIGS. 1 and 2 in different states of installation, has also been inserted into the protective tube 1 together with the fiber-optic sensor 2. During and immediately after pushing the fiber-optic sensor 2 and steel wire 4 into the tube, the steel wire is untwisted and lies essentially with its axis parallel to that of the fiber-optic sensor 2. An air gap can exist between the fiber-optic sensor 2 and the inner wall of the protective tube 1, because the fiber-optic sensor 2 is at practically any given location within the free internal cross-section of the protective tube 1. Such an air gap is undesirable however, because the air gap has a thermally-insulating effect and makes it more difficult to rapidly equalize the temperature of the fiber-optic sensor 2 to the temperature of the protective tube 1. An advantage of glass-fiber temperature measuring technology, i.e., its potentially rapid reaction time as a result of low thermal capacity of the sensor, can therefore be lost because of the existence of the air gap.

FIG. 2 shows the installation state after the steel wire 4 has been twisted. In this figure the steel wire 4 has assumed an essentially helical shape and, in so doing, has greatly reduced the free internal cross-section of the protective tube 1 available for supporting the fiber-optic sensor 2. At the points at which windings of the steel wire 4 come into contact with the fiber-optic sensor 2, the fiber-optic sensor 2 is pressed against the inner wall of the protective tube 1 by the steel wire 4, which acts as a spring. Although there is only one pressure point present with each winding of the helical shape, the air space between the fiber-optic sensor 2 and protective tube 1 is still minimized in this way, which results in the desired more rapid transmission of heat and smaller measurement delay. After being twisted, the wire 4 is fixed in the protective tube 1 by a clamping facility 5, for example, a simple grub screw. An optical connector 6 serves to connect the fiber-optic sensor 2 to a transmitter (not shown).

Figure 3:
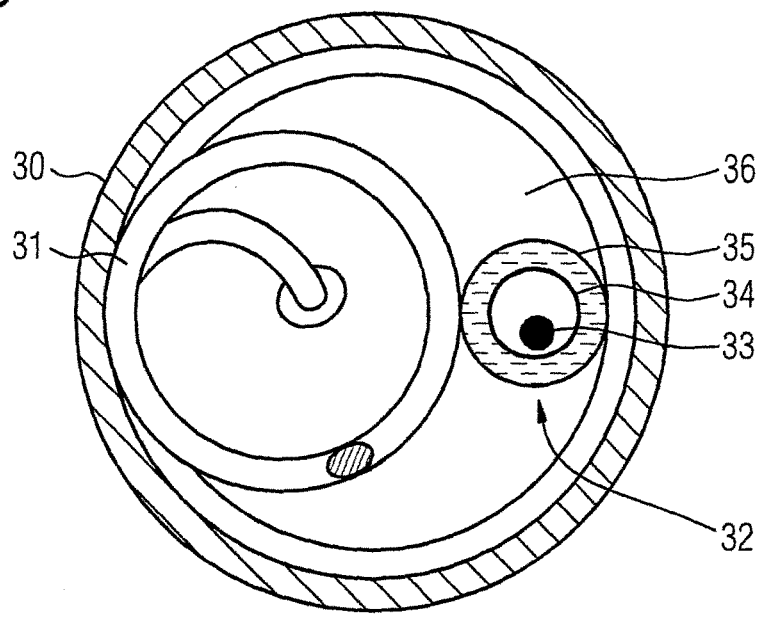
FIG. 3 shows a cross-section of a protective tube with twisted wire as a filler element in accordance with the invention.

FIG. 3 shows a cross-section of a protective tube 30, in which a twisted wire 31 is inserted as the filler element, together with a fiber-optic sensor 32. The actual measuring fiber 33 is located in a stainless steel hollow tube 34, which in its turn is surrounded by a woven protective sleeve 35. At their respective end facing away from the transmitter, the wire 31 and the fiber-optic sensor 32 are fastened to a slider element 36. This serves to facilitate the insertion process during the installation and also serves to accept the torque when twisting the wire 31. The diameter of the wire 31 is selected so that, by comparison with the stainless steel hollow tube 34, it possesses a far lower torsional stiffness. This largely prevents the fiber-optic sensor 32 from also turning when the wire 31 is being twisted. For a diameter of the stainless steel hollow tube 34 of, s 1.2 mm, this is already sufficiently insured by selecting a wire 31 with a diameter of, for example 0.5 mm. For an application at high temperatures, the wire 31 consists of a material with a high heat tolerance, such as Inconel X750. This insures that the fiber-optic sensor 32 is pressed against the inner wall of the protective tube 30 over its entire lifetime and that no heat-insulating air gap arises. If the robustness of the stainless steel hollow tube 34 allows, the woven protective sleeve 35 can also be dispensed with, through which a further improvement in the heat transfer between protective tube 30 and measuring fiber 33 is achieved.

Figure 4:
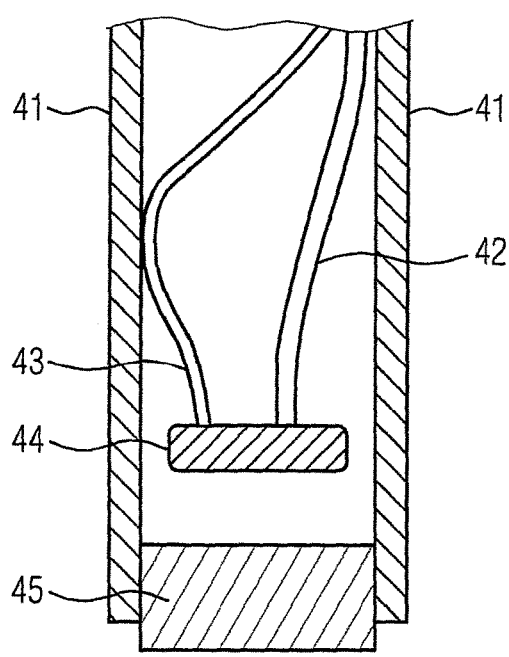
FIG. 4 shows a detailed view of one end of the protective tube of FIG. 1.
Figure 5:
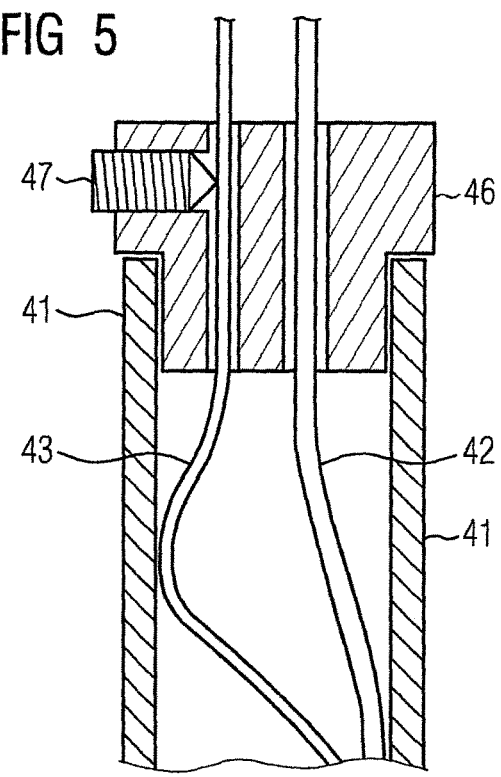
FIG. 5 shows a detailed view of the other end of a protective tube of FIG. 1 in the installed state.

FIGS. 4 and 5 show enlarged diagrams of the end of a protective tube 41 facing away from the transmitter or of the end facing towards the transmitter, respectively. In FIGS. 4 and 5, the same reference characters are used for the same parts. In order to reduce the danger of an air gap being formed between the inner wall of the protective tube 41 and the sensor 42, a fiber-optic sensor 42 is pressed against the inner wall by a wire 43 as a reshapable filler element. A slider element 44 serves to reduce the friction during installation or exchange of the fiber-optic sensor 42 and also serves to establish a stable connection between the sensor 42 and the wire 43 at its end facing away from the transmitter. The end of the protective tube 41 facing away from the transmitter is closed off by a stopper 45. The opposite end of the protective tube 41 is provided with a stopper 46, through which the fiber-optic sensor 42 and the wire 43 are guided. A clamping facility 47, such as a simple grub screw in a threaded hole, serves to fix the wire 43 in the twisted state. Before any possible dismantling, the clamping facility 47 is released, the stopper 46 is removed and the fiber-optic sensor 42, together with the untwisted wire 43 and the slider element 44, is removed from the protective tube 41.

Figure 6:
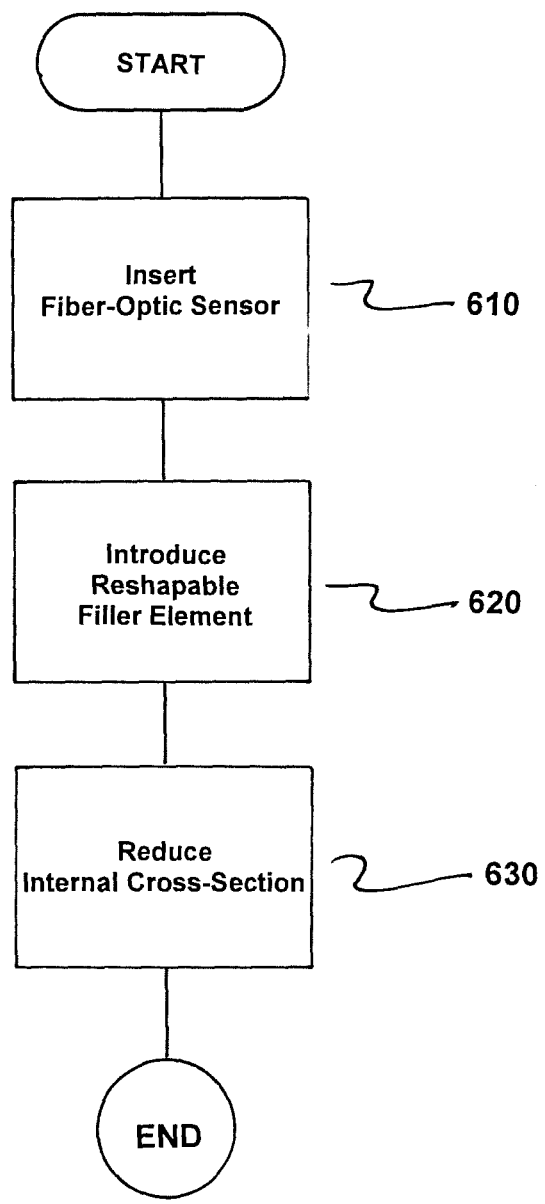
FIG. 6 is a flowchart of the method in accordance with the invention.

FIG. 6 is a flowchart of a method for installing a fiber-optic sensor (2, 32, 42) in a protective tube (1, 30, 41) in accordance with the invention. The method comprises pushing the fiber-optic sensor (2, 32, 42) into the protective tube (1, 30, 41) through an end of the protective tube (1, 30, 41) open during installation, as indicated in step 610.

Next, a reshapable filler element (4, 31, 43) is introduced into the protective tube (1, 30, 41), essentially on the axis parallel to the fiber-optic sensor (2, 32, 42), in an axial area of the protective tube (1, 30, 41), in which sensor elements (3a, 3b, 3c, 3d) for temperature detection are located when the fiber-optic sensor (2, 32, 42) has been pushed into the tube, as indicated in step 620.

The free internal cross-section of the protective tube (1, 30, 41) remaining in the axial area for supporting the fiber-optic sensor (2, 32, 42) is now reduced by changing the shape of the filler element (4, 31, 43) after the fiber-optic sensor (2, 32, 42) and the filler element (4, 31, 43) have been brought into their axial target position in the protective tube (1, 30, 41), such that the fiber-optic sensor (2, 32, 42) is pressed by the filler element (4, 31, 43) against the protective tube (1, 30, 41), as indicated in step 630.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for installing a fiber-optic sensor having a plurality of sensor elements into a protective tube, the method comprising;
   pushing the fiber-optic sensor having the plurality of sensor elements into the protective tube through an end of the protective tube open during installation;
   introducing a reshapable filler element into the protective tube, essentially on an axis parallel to the fiber-optic sensor, in an axial area of the protective tube, in which the plurality of sensor elements are located for temperature detection when the fiber-optic sensor has been pushed into the tube; and
   reducing a remaining open internal cross-section of the protective tube in the axial area for supporting the fiber-optic sensor by changing the shape of the reshapable filler element into an essentially helical shape after the fiber-optic sensor and the filler element have been brought into their axial target position in the protective tube, such that the fiber-optic sensor is pressed by the reshapable filler element against the protective tube.

2. The method as claimed in claim 1, wherein the reshapable filler element is formed by a wire which is twisted along a longitudinal axis of the wire to reduce the remaining open internal cross-section in the axial area of the protective tube such that the wire assumes the essentially helical shape caused by torsional stress occurring during the twisting.

3. The method as claimed in claim 2, wherein the wire is manufactured from spring steel.

4. The method as claimed in claim 2, wherein a measuring fiber and a steel hollow tube surrounding the fiber form components of the fiber-optic sensor, wherein the wire has a lower torsional stiffness than the steel hollow tube and is rigidly connected along with the steel hollow tube to a point ahead of the plurality of sensor elements on insertion.

5. The method as claimed in claim 3, wherein a measuring fiber and a steel hollow tube surrounding the fiber form components of the fiber-optic sensor, wherein the wire has a lower torsional stiffness than the steel hollow tube and is rigidly connected along with the steel hollow tube to a point ahead of the plurality of sensor elements on insertion.

6. The method as claimed in claim 4, wherein a slider element is arranged at a connection point of the wire and the steel hollow tube.

7. A fiber-optic sensor comprising: a plurality of sensor elements for temperature detection;
a protective tube, the fiber-optic sensor being pushed into the protective tube such that the plurality of sensor elements of the fiber-optic sensor are located in an axial area of the protective tube; and
a reshapable filler element introduced into the protective tube essentially in parallel to the axis of the fiber-optic sensor;
wherein during a measuring operation, the reshapable filler element is configured to change shape such that, a remaining open internal cross-section of the protective tube in the axial area for supporting the fiber-optic sensor is reduceable such that the fiber-optic sensor is pressed by the reshapable filler element against a wall of the protective tube; and
wherein to install the fiber-optic sensor in the protective tube and to remove the fiber-optic sensor from the protective tube, the reshapable filler element is configured to move into an essentially helical shape, the remaining open internal cross-section of the protective tube in the axial area for supporting the fiber-optic sensor is adjustable such that the fiber-optic sensor is axially movable in the protective tube.

* * * * *